United States Patent
Lu et al.

(10) Patent No.: US 11,177,847 B2
(45) Date of Patent: Nov. 16, 2021

(54) METHOD FOR COMPENSATING FOR DEGRADATION OF SIGNAL DURING TRANSMISSION OF THE SIGNAL AND TRANSMITTER UTILIZING THE SAME

(71) Applicant: MediaTek Singapore Pte. Ltd., Singapore (SG)

(72) Inventors: Chiyuan Lu, San Jose, CA (US); Ching-Chia Cheng, Hsin-Chu (TW); Toru Matsuura, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/826,310

(22) Filed: Mar. 23, 2020

(65) Prior Publication Data
US 2020/0304158 A1  Sep. 24, 2020

Related U.S. Application Data

(60) Provisional application No. 62/822,081, filed on Mar. 22, 2019.

(51) Int. Cl.
*H04B 1/04* (2006.01)

(52) U.S. Cl.
CPC ..... *H04B 1/0475* (2013.01); *H04B 2001/045* (2013.01)

(58) Field of Classification Search
CPC .... H04B 1/0475; H04B 1/62; H04B 2001/04; H04B 2001/0408; H04B 2001/0416; H04B 2001/0425; H04B 2001/0433; H04B 2001/0411; H04B 2001/045
USPC ........................ 375/295, 296, 297
See application file for complete search history.

(56) References Cited

U.S. PATENT DOCUMENTS

| | | | | |
|---|---|---|---|---|
| 4,882,767 A * | 11/1989 | Machida | ............... | H03F 1/30 455/117 |
| 5,422,598 A * | 6/1995 | Maeda | ............... | H03G 3/3042 330/136 |
| 6,788,744 B1 * | 9/2004 | Hirama | ............... | H03G 3/3042 375/146 |
| 7,058,139 B2 * | 6/2006 | Duperray | ............... | H03C 3/403 375/297 |
| 7,376,200 B2 * | 5/2008 | Demir | ............... | H03C 3/406 375/296 |
| 8,422,969 B2 * | 4/2013 | Wang | ............... | H04B 1/04 455/127.2 |

(Continued)

OTHER PUBLICATIONS

Inchan Ju, et al., A Highly Linear High-Power 802.11ac/ax WLAN SiGe HBT Power Amplifier Using a Compact 2nd-Harmonic-Shorting Four-Way Transformer and Integrated Thermal Sensors, Feb. 18, 2019, IEEE.

*Primary Examiner* — Siu M Lee
(74) *Attorney, Agent, or Firm* — Winston Hsu

(57) ABSTRACT

A method for compensating for degradation of a signal during transmission of the signal includes: performing thermal detection and accordingly generate a thermal detection result indicative of a temperature of a signal processing circuit; and performing property adjustment to adjust a predetermined property of the signal according to the thermal detection result. The property adjustment is performed on the signal according to the thermal detection result associated with previously transmitted signal. After performing the property adjustment, a characteristic value of the signal reaches a preset level.

17 Claims, 12 Drawing Sheets

(56) References Cited

U.S. PATENT DOCUMENTS

| | | | |
|---|---|---|---|
| 2011/0156815 A1* | 6/2011 | Kim | H04L 27/0008 |
| | | | 330/149 |
| 2015/0180518 A1 | 6/2015 | Whittaker | |
| 2017/0194916 A1* | 7/2017 | Whittaker | H03G 3/3047 |
| 2018/0115287 A1* | 4/2018 | Rabjohn | H03F 1/0266 |
| 2018/0331662 A1* | 11/2018 | Maa | H03F 3/245 |

* cited by examiner

METHOD FOR COMPENSATING FOR DEGRADATION OF SIGNAL DURING TRANSMISSION OF THE SIGNAL AND TRANSMITTER UTILIZING THE SAME

CROSS REFERENCE TO RELATED APPLICATIONS

This Application claims the benefit of U.S. Provisional Application No. 62/822,081, filed on Mar. 22, 2019, the entirety of which is incorporated by reference herein.

BACKGROUND

Wireless communications systems are utilized in a variety contexts involving information transfer over long and short distances alike. As a general matter, wireless communications involve a Radio Frequency (RF) carrier signal that is variously modulated to represent information/data, and the encoding, modulation, transmission, reception, de-modulation, and decoding of the signal conform to a set of standards for coordination of the same.

RF power amplifiers utilized in wireless communications systems ideally have linear performance, which may be described in terms of the error vector magnitude (EVM) of the transmitted signal. When a transmitter (with high-heat source, e.g. the RF power amplifier) is enabled for a period of time to transmit a packet, the analog-error-over-time is changing during this period due to thermal transient and causes EVM degradation. The EVM degradation caused by thermal transient is an undesired result of wireless communication, which may cause an error at the receiver side when the receiver is estimating the transmission power utilized by the transmitter to transmit the signals.

Therefore, a novel method and transmitter architecture for compensating the degradation, which is caused by thermal transient effect, of a system during transmission of the signal is highly required.

SUMMARY

It is one object of the present invention to provide a novel method and transmitter architecture for compensating for degradation, which is caused by thermal transient effect, of a system during transmission of the signal. For example, the proposed thermal detection and compensation may be performed on the same packet within one packet period and the compensation is performed in real-time based on the latest thermal detection result. For another example, the proposed thermal detection and compensation may be performed across different packets and the compensation is performed in real-time based on the latest thermal detection result. After compensation, a characteristic value of the transmitted signal may reach a preset level or a desired level, or the characteristic value of the transmitted signal may be improved.

According to one embodiment, a transmitter, arranged to transmit a signal comprises a first signal processing circuit arranged to process the signal before transmission; a thermal sensor arranged to perform thermal detection and accordingly generate a thermal detection result which is indicative of a temperature of the first signal processing circuit; and a second signal processing circuit, arranged to receive the thermal detection result and perform property adjustment to adjust a predetermined property of the signal according to the thermal detection result. The signal processing circuit adjusts the predetermined property of the signal according to the thermal detection result associated with previously transmitted signal. After performing the property adjustment, a characteristic value of the signal reaches a preset level.

According to another embodiment, a method for compensating for degradation of a signal during transmission of the signal comprises: performing thermal detection and accordingly generate a thermal detection result which indicative of a temperature of a signal processing circuit; and performing property adjustment to adjust a predetermined property of the signal according to the thermal detection result. The property adjustment is performed on the signal according to the thermal detection result associated with previously transmitted signal. After performing the property adjustment, a characteristic value of the signal reaches a preset level.

In one preferred embodiment, the thermal detection is performed every 1 us in a packet, and the property adjustment is performed every 1 us on the realtime signal to correct the signal level based on the thermal detection result from the previous 1 us. In one embodiment, the thermal detection is performed on one packet, and the property adjustment is performed on a next packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
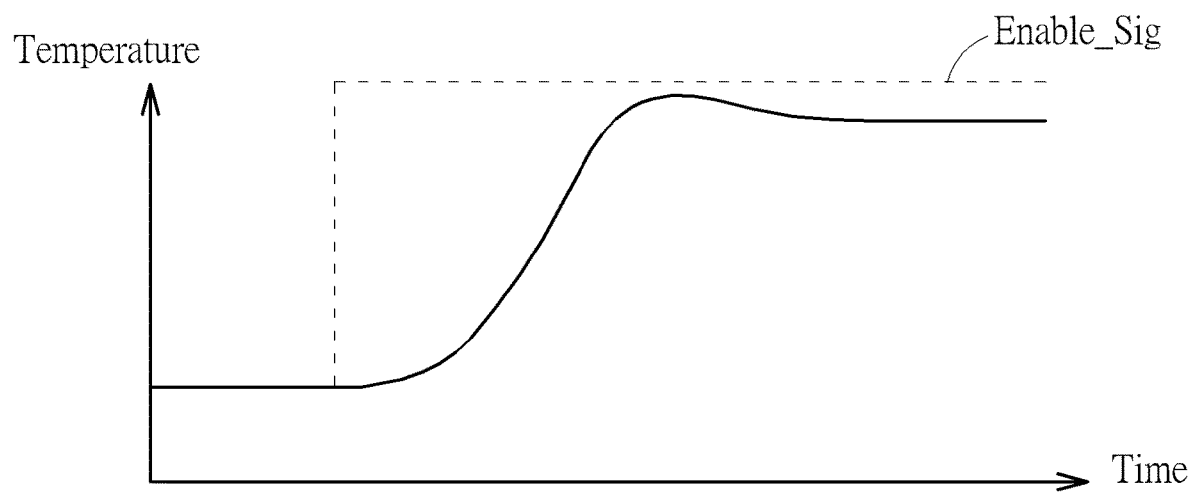
FIG. 1 is a schematic curve showing a result of temperature rise over time when a heat source within an electronic device is enabled.

FIG. 1 is a schematic curve showing a result of temperature rise over time when a heat source within an electronic device is enabled. As shown in FIG. 1, when a heat source (such as a power amplifier or any signal processing circuit that could generate heat when performing signal processing) within an electronic device (such as a transmitter or a transceiver) is enabled (for example, the dotted line is an enable signal Enable_Sig of the heat source, and when the enable signal Enable_Sig is asserted/pulled high, the heat source is enabled), the temperature within the electronic device is raised accordingly.

For example, after a power amplifier (PA) on an IC is enabled, the PA starts to draw a large amount of current and its local temperature gradually increases. This heat energy diffuses to the ambient and the rest of the IC via thermal diffusivity of the IC and package. Eventually it reaches a steady state.

However, when the temperature within the electronic device is raised, the output power of the signal transmitted by the electronic device may drop accordingly, causing the undesired EVM degradation.

Figure 2:
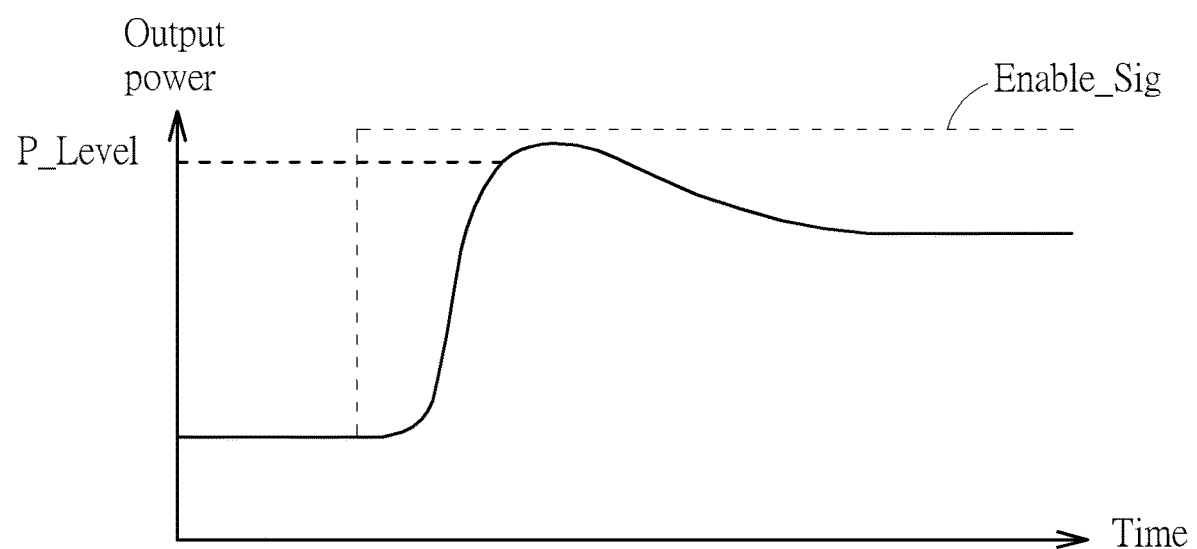
FIG. 2 is a schematic curve showing a result of output power drop over time when a heat source within an electronic device is enabled.

FIG. 2 is a schematic curve showing a result of output power drop over time when the heat source within an electronic device is enabled. Suppose that the desired output power of the transmitted signal may be set to a preset level P_level. As shown in FIG. 2, the actual output power may reach the preset level P_level in the beginning, but drop thereafter due to the temperature rise.

As showing in FIG. 2, due to the thermal transient shown in FIG. 1, the output power is higher initially and eventually settles to a steady state.

It should be noted that FIG. 1 and FIG. 2 are illustrated by way of example and the drawings are not necessarily drawn to scale.

The output power drop is an undesired result for wireless communication. For example, when the power level of the preamble of an Orthogonal Frequency-Division Multiplexing (OFDM) packet is calculated by the modem at the receiver side but the output power drops in the signal or the payload portion of the OFDM packet, some reception error or decoding error may occur at the receiver side.

Figure 3:
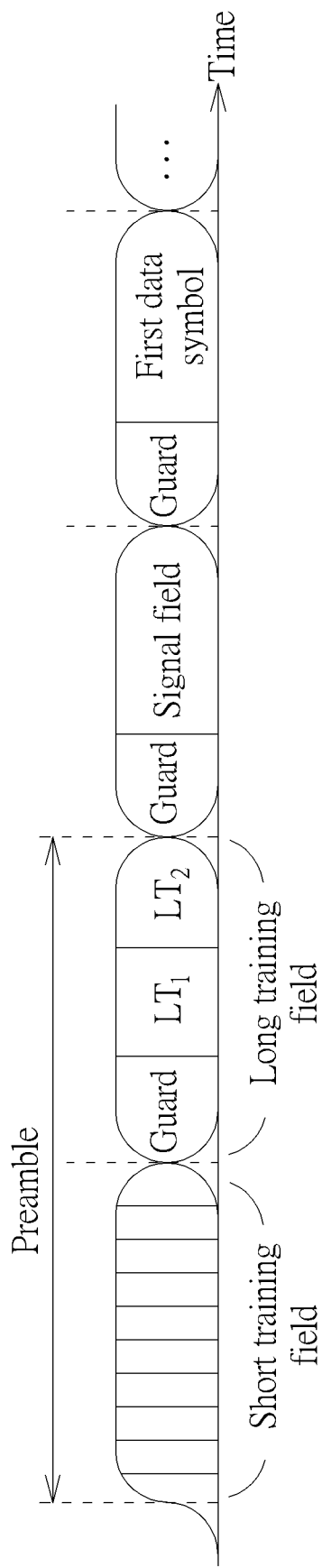
FIG. 3 is IEEE 802.11a frame format.

FIG. 3 is IEEE 802.11a frame format in wireless local area network (WEAN). Generally, the preamble is provided for a receiver (for example, another electronic device which is communicating with the electronic device (the transmitter) and is receiving this packet) for detection, correction or synchronization tasks, such as packet detection, time and frequency correction/synchronization, or others.

When the receiver determines the scaling factor utilized by the received signal power of the preamble portion, the receiver may use this scaling factor to perform some optimization tasks, so as to facilitate the subsequent reception of the rest portion of the OFDM packet, such as the signal field and the data symbols shown in FIG. 3.

However, when the output power drops as the case shown in FIG. 2 in the rest portion of the OFDM packet, the scaling factor is not valid for the rest portion and the receiver may be unable to successfully receive or decode the rest portion of the OFDM packet, and the communication quality or performance may severely degrade.

To solve this problem, a method for compensating for degradation (for example, gain drop) of a signal during transmission of the signal and the associated transmitter structure are proposed.

Figure 4:
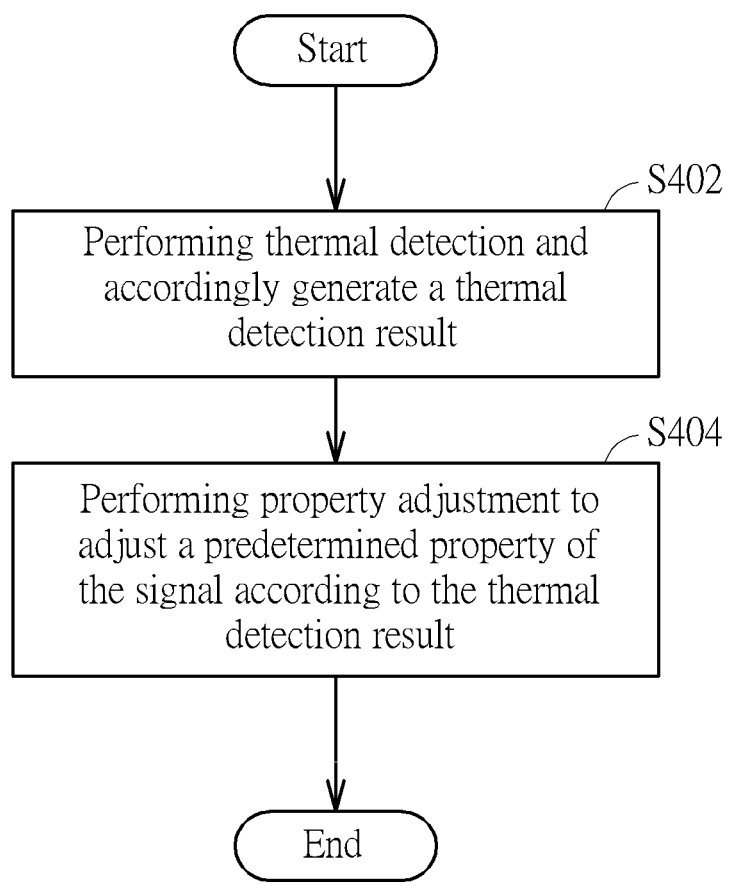
FIG. 4 shows a flow chart of a method for compensating for degradation of a signal during transmission of the signal according to an embodiment of the invention.

FIG. 4 shows a flow chart of a method for compensating for degradation of a signal during transmission of the signal according to an embodiment of the invention. The method may be applied to a transmitter or a transceiver, which comprises at least one signal processing circuit (e.g., power amplifier) that could generate heat when performing signal processing, of an electronic device and comprise the following steps:

S402: performing thermal detection and accordingly generate a thermal detection result. For example, thermal detection is performed during signal transmission.

S404: performing property adjustment to adjust a predetermined property of the signal according to the thermal detection result. For example, one property adjustment is performed in response to the latest thermal detection result obtained during signal transmission or a difference between the latest thermal detection result obtained during signal transmission and another thermal detection result obtained before the latest thermal detection result.

Steps S402 and S404 may be repeatedly performed when the transmitter or the transceiver is processing the signal to be transmitted (for example, the TX signal).

According to an embodiment of the invention, one or more thermal detection results associated with previously transmitted signal may be provided and utilized as a reference when performing property adjustment on the transmitting signal or the signal to be transmitted. The thermal detection result associated with previously transmitted signal may refer to the thermal detection result obtained when the signal processing circuit (such as a heat source) is processing the previously transmitted signal.

Steps S402 and S404 may be performed over the time "WITHIN" a packet. Take WiFi standard as an example where one "symbol" is equal to 4 us, the correction may be performed every 128 symbols based on the thermal detection results detected from the previous or latest 128 symbols. The thermal detection results are stored in a storage unit, and therefore could be used to correct/compensate the later symbols. According to an embodiment of the invention, the signal processed by a transmitter or a transceiver may be viewed as comprising at least a first section (former section) and a second section (later section), and the first section comes earlier than the second section and will be transmitted earlier than the second section. The thermal detection (step S402) may be performed when the signal processing circuit (such as a heat source) is processing the first section of the signal, and the property adjustment (step S404) may be performed on the second section of the signal. For example, after the first section of the signal is processed by the signal processing circuit, the property adjustment may be performed on the second section of the signal before the second section of the signal is processed by the signal processing circuit.

The purpose of performing the property adjustment is to compensate for degradation of the signal that would occur during transmission of the signal. In the embodiments of the invention, after performing the property adjustment, a characteristic value of the signal may reach a preset level or may be improved as compared to the characteristic value of previously transmitted signal. To be more specific, the characteristic value of the previously transmitted signal may deviate from the preset level due to the temperature rise as discussed above, causing the undesired degradation. After performing the property adjustment, the characteristic value of the rest of the signal may be recovered and may reach the preset level or may be significantly improved. In an embodiment of the invention, the preset level may be a desired level of the transmitter or the transceiver, such as a desired amplitude, a desired gain, a desired output power, a desired scaling factor, or a desired impairments degrading EVM of the transmitter or the transceiver that can ensure sufficient signal quality or the transmission performance. In another embodiment of the invention, the preset level may be a level that is sufficient for the receiver to be able to successfully receive or decode the signal transmitted by the transmitter or the transceiver.

Figure 5:
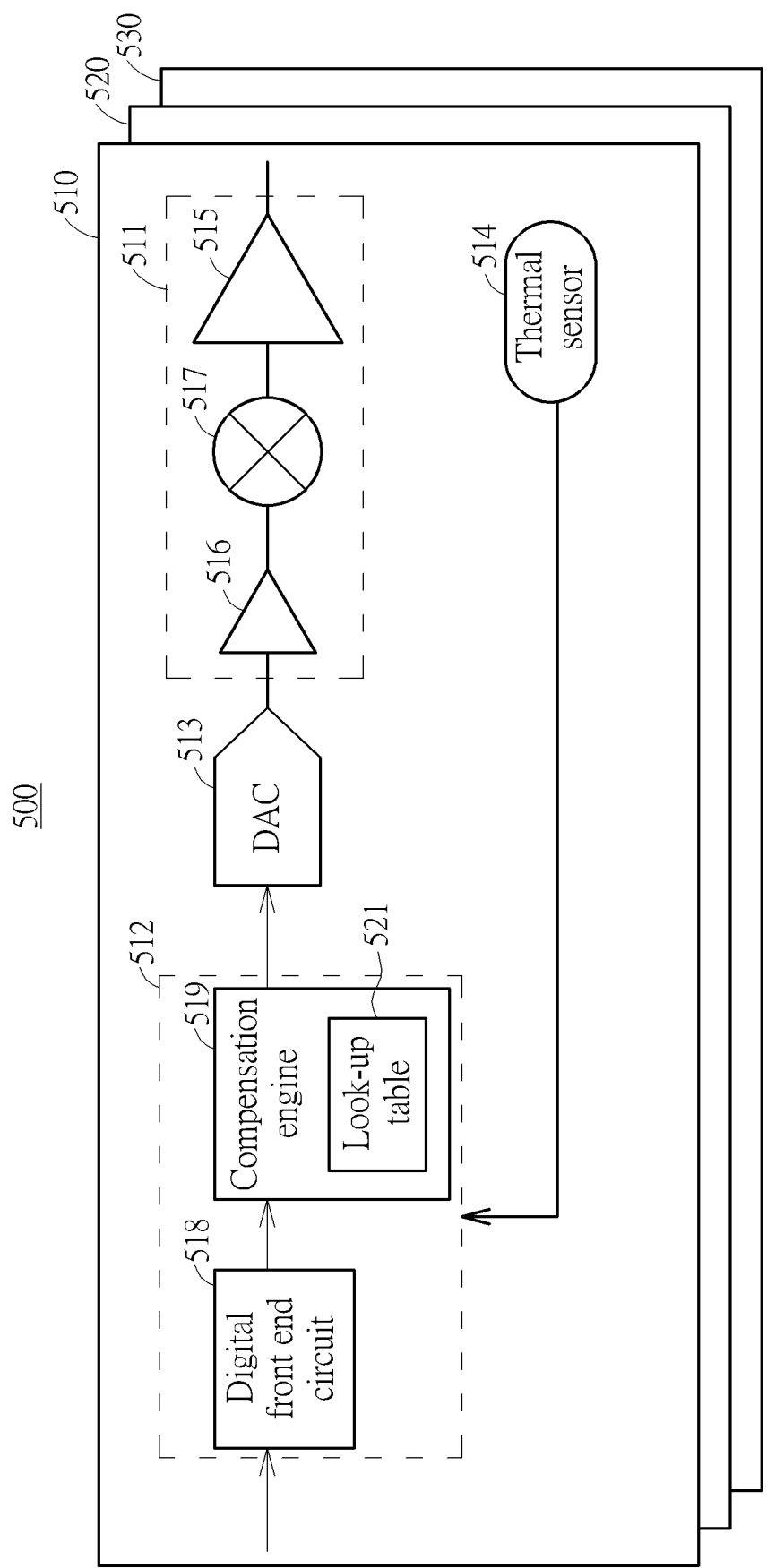
FIG. 5 shows an exemplary block diagram of a transmitter according to an embodiment of the invention.

FIG. 5 shows an exemplary block diagram of a transmitter according to an embodiment of the invention. The transmitter 500 may comprise one or more transmitter subunits, such as the transmitter subunits 510, 520 and 530, coupled to an antenna module (not shown) comprising one or more antennas. A transmitter subunit may also be regarded as a transmitter chain which comprises a plurality of signal processing circuits for processing the signals to be transmitted. The transmitter subunits 510, 520 and 530 may have similar or substantially the same structure. For simplicity, only the structure of transmitter subunit 510 will be illustrated.

The transmitter subunit 510 may comprise at least an analog signal processing module 511, a digital signal processing module 512, a digital to analog converter (DAC) 513 and a thermal sensor 514. The analog signal processing module 511 may comprise one or more signal processing circuits arranged to perform signal processing in the analog domain. For example, the analog signal processing module 511 may comprise amplifiers 515 and 516 and an up-conversion mixer 517. The digital signal processing module 512 may comprise one or more signal processing circuits arranged to perform signal processing in the digital domain. For example, digital signal processing module 512 may comprise a digital front end circuit 518 and a compensation engine 519.

The digital signal processing module 512 may be coupled between a baseband signal processing module (not shown) and the analog signal processing module 511 or may be coupled to the analog signal processing module 511 and comprised in the baseband signal processing module. In addition, in some embodiments of the invention, the compensation engine 519 and the digital front end circuit 518 may be implemented as separate devices. In other embodiments of the invention, the compensation engine 519 may be integrated in and as a portion of the digital front end circuit 518. Therefore, the structure shown in FIG. 5 is merely one of a variety of possible implementations of the invention, and the invention should not be limited thereto.

According to an embodiment of the invention, the thermal sensor 514 is arranged to perform thermal detection and accordingly generate a thermal detection result, wherein the thermal detection result is indicative of the temperature of a signal processing circuit. In the embodiment shown in FIG. 5, the amplifier 515 is a major heat source that would generate heat when performing signal processing and cause signal degradation or gain drop. By way of example, but not limitation, the amplifier 515 is a power amplifier and the thermal sensor 514 is disposed adjacent to the amplifier 515 for detecting the temperature of the amplifier 515. In practice, any means capable of detecting the temperature of the amplifier 515 or generating a thermal detection result being indicative of the temperature of the amplifier 515 may be employed.

The compensation engine 519 may be arranged to receive the thermal detection result from the thermal sensor 514 and perform property adjustment to adjust a predetermined property of the signal according to the thermal detection result.

According to an embodiment of the invention, a feedback mechanism may be employed to perform thermal detection and signal compensation in time domain. The thermal detection and signal compensation (or, calibration) loop may iterate over the time. That is, the thermal detection result associated with previously transmitted signal may be fed back and provided as reference information for performing compensation or property adjustment on not-yet-transmitted signal that is currently being processed or to be processed by the transmitter.

As an example, the thermal detection may be performed when the amplifier 515 is amplifying a former section of the signal, and the property adjustment may be performed on the later section of the signal before the later section of the signal is provided to the amplifier 515. After performing the property adjustment, a characteristic value of the signal reaches a preset level.

As an example, the thermal detection may be performed when the amplifier 515 is transmitting the signal (packet(s)), periodically and simultaneously over the time. The property adjustment may be performed on the not-yet-transmitted portion of the signal (packet(s)) in module 512 based on the temperature reading stored in the memory of the previous transmitted section (or period) of a packet or packets. After performing the property adjustment, a characteristic value of the signal reaches a preset level. The adjustment operation will continue periodically or aperiodically until the end of the signal (packet), since the analog error could vary over the time.

According to an embodiment of the invention, the thermal sensor 514 may keep detecting the temperature of a signal processing circuit (as an example but not limited to, the amplifier 515) or may periodically or aperiodically detect the temperature of the signal processing circuit, and the compensation engine 519 may periodically or aperiodically read the temperature detected by the thermal sensor 514. For example, the compensation engine 519 may read the temperature every TS micro second, where TS may be any positive value depending upon actual design considerations.

Figure 6:
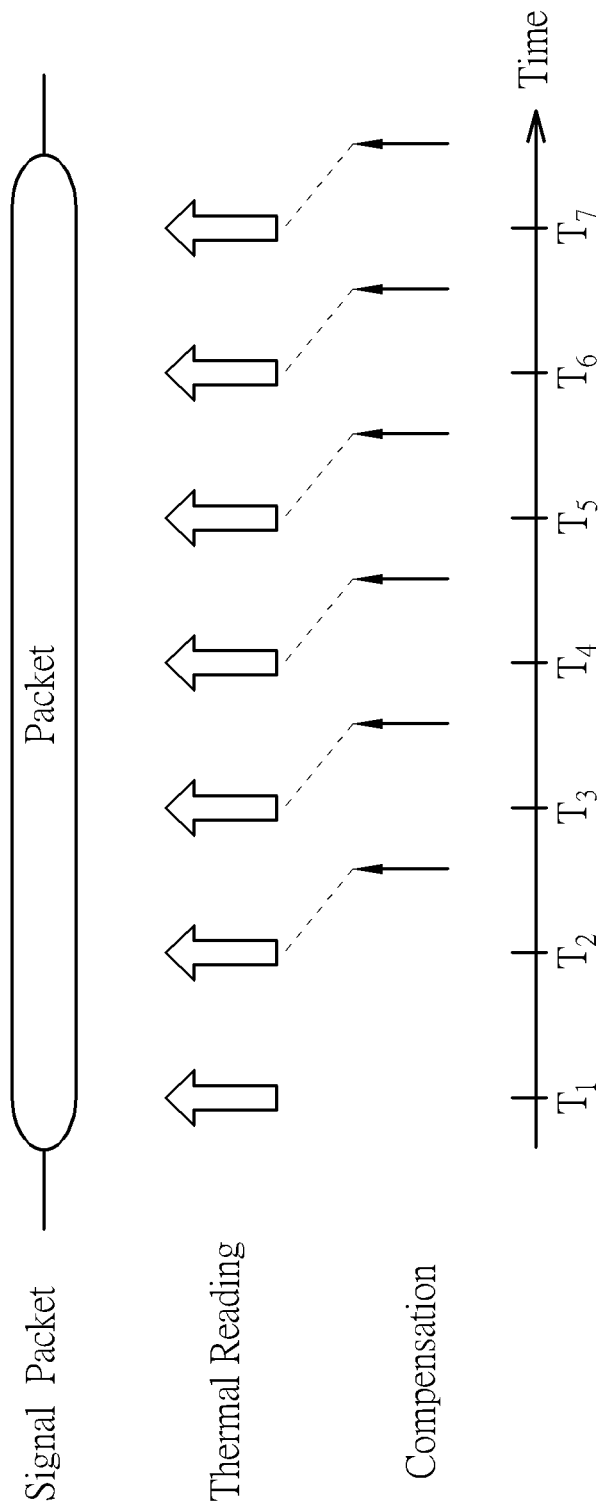
FIG. 6 is a schematic diagram showing multiple thermal readings within a packet according to an embodiment of the invention.

FIG. 6 is a schematic diagram showing multiple thermal readings within a packet according to an embodiment of the invention. According to an embodiment of the invention, the compensation engine 519 may read the temperature several times within a packet period, for example, the compensation engine 519 may read the temperature at time T1-T7. The thermal sensor 514 and the compensation engine 519 are parts of a feedback loop. To be more specific, the compensation engine 519 may read the temperature detected when a signal processing circuit (as an example but not limited to, the amplifier 515) is processing a former section of a packet, and the compensation engine 519 may use the information regarding the thermal detection result to adjust a predetermined property of a later section of the signal, so to compensate for degradation of the signal during transmission of the signal in real-time based on the latest thermal detection result.

As an example, the compensation engine 519 may use the thermal detection result read at time T1 to adjust a predetermined property of a later section of the signal at the other time later than the time T1 and within the packet. Similarly, the compensation engine 519 may use the thermal detection result read at time T2 to adjust a predetermined property of a later section of the signal at the other time later than the time T2 and within the packet. It should be noted that in other embodiments of the invention, the thermal detection and the compensation (that is, property adjustment) may also be performed across different packets, and the invention should not be limited thereto. It should be further noted the dotted line shown in FIG. 6 for connecting the thermal reading time and the compensation time is just an example for showing one possible relationship between the thermal reading time and the compensation time, and the invention should not be limited thereto.

As another example, the compensation engine 519 may use a difference between at least two thermal detection results read before time T3 to adjust a predetermined property of a later section of the signal at the time T3 or at the other time later than the time T3 and within the packet. Similarly, the compensation engine 519 may use a difference between at least two thermal detection results read before time T4 to adjust a predetermined property of a later section of the signal at the time T4 or at the other time later than the time T4 and within the packet. It should be noted that in other embodiments of the invention, the thermal detection and the compensation (that is, property adjustment) may also be performed across different packets, and the invention should not be limited thereto. It should be further noted the dotted line shown in FIG. 6 for connecting the thermal reading time and the compensation time is just an example for showing one possible relationship between the thermal reading time and the compensation time, and the invention should not be limited thereto.

According to an embodiment of the invention, the compensation engine 519 may obtain thermal detection result (e.g. the temperature detected by the thermal sensor 514), perform analog to digital conversion (ADC) on the thermal detection result (e.g. when the detected temperature is an analog signal) and determine the amount of adjustment of the predetermined property of the signal. For example, the compensation engine 519 may comprise a loop-up table (LUT) 521. The compensation engine 519 may calculate the temperature variation according to the thermal detection results obtained at different time and the loop-up table 521 may convert the temperature variation to the amount of adjustment of the predetermined property according to one or more mapping tables stored therein.

In the embodiments of the invention, two compensation approaches are proposed. The first approach senses/detects and cancels the thermal-induced impairments in a static period to guarantee the signal quality over time. The second approach senses/detects and cancels the thermal-induced impairments with a programmable threshold. This is to ensure the minimal error with less digital spurs, the cancellation only occurs when it is needed.

To be more specific, in the first approach, the TX signals are compensated with a static period. When a signal is transmitted, the compensation engine 519 may record value of the thermal-dependent predetermined property at initialization-stage of the packet at the time T0, where T0 is programmable. Then, the compensation engine 519 may read the temperature with a static period, and cancel the temperature-dependent property variation/impairment caused by temperature variation to ensure signal quality over the time. The temperature-to-impairment conversion may be pre-stored in look-up table 521.

Figure 7:
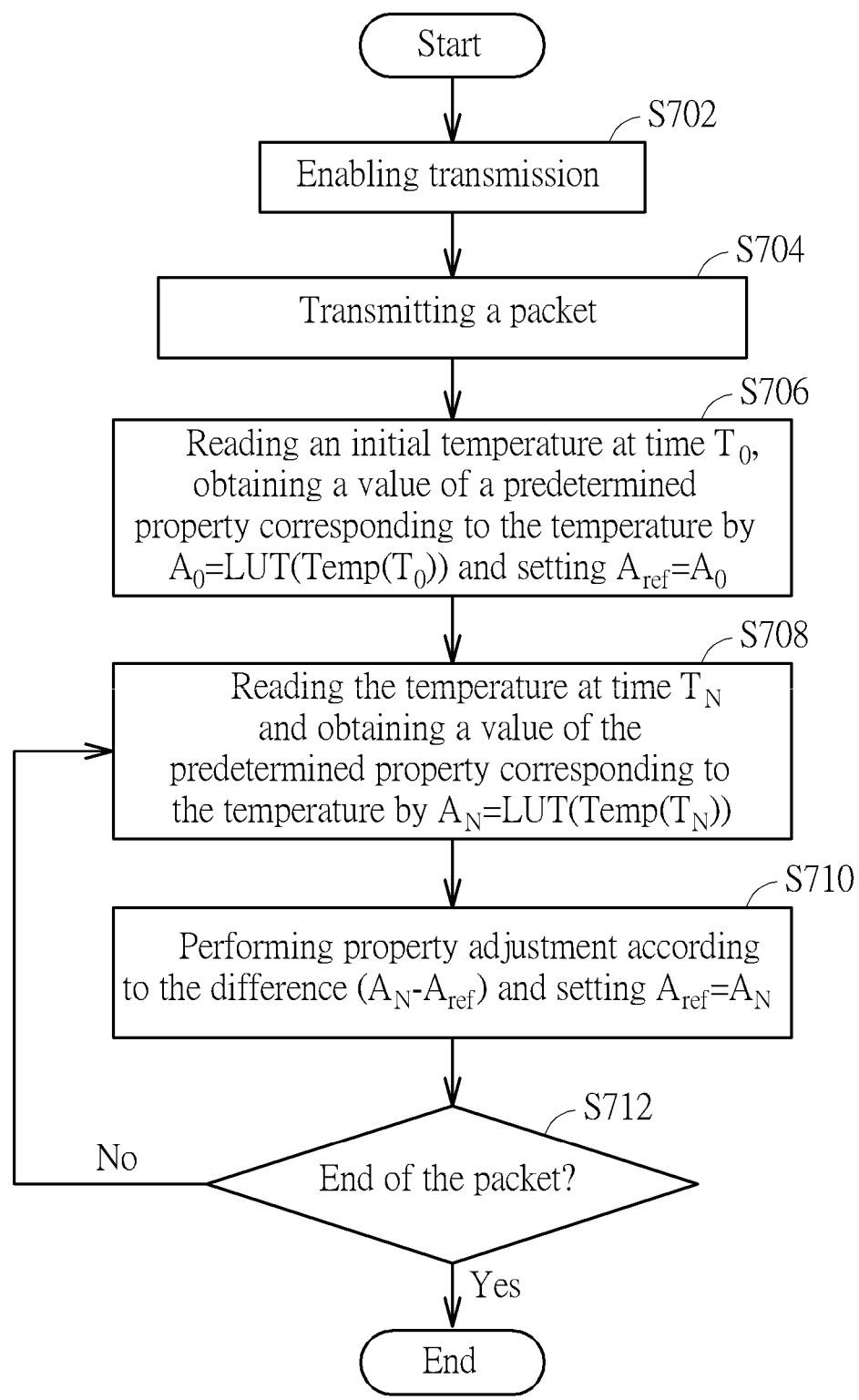
FIG. 7 shows a flow chart of a compensation approach according to a first embodiment of the invention.

FIG. 7 shows a flow chart of a compensation approach according to a first embodiment of the invention. The compensation approach may comprise the following steps:

S702: Enabling the transmission by enabling the signal processing circuits in a transmitter chain for performing a forthcoming packet transmission. Note that the signal processing circuits may be enabled in response to a corresponding enable signal, and when the signal processing circuits are enabled, the thermal sensor 514 is also enabled to perform thermal detection.

S704: Transmitting a packet. Note that the transmitting in step S704 comprises the signal processing performed by the signal processing circuits in the transmitter chain before the signal is actually transmitted out and propagate in the air.

S706: Reading an initial temperature detected in the preamble of the packet (that is, initially detected when the signal processing circuit is processing the preamble of the packet) at time $T_0$, obtaining a value $A_0$ of a predetermined property corresponding to the initial temperature by a temperature-to-impairment conversion pre-stored in the look-up-table (LUT), e.g. $A_0$=LUT(Temp($T_0$)), and setting a reference property value $A_{ref}=A_0$.

S708: Reading the temperature at time $T_N$, where $T_N=T_0+ n*T_S$, n is a positive integer and n may be increased every time when the loop is entered again, and obtaining a value $A_N$ of the predetermined property corresponding to the temperature by $A_N$=LUT (Temp ($T_N$)).

S710: Performing property adjustment to adjust a predetermined property of the signal according to the difference $(A_N-A_{ref})$ to compensate for degradation of the packet on the signal to be transmitted and setting $A_{ref}=A_N$. According to an embodiment of the invention, the property adjustment may be performed on the digital signal in digital domain.

It should be noted that in other embodiments of the invention, a temperature difference-to-impairment conversion may also be pre-stored in the look-up-table (LUT). When the temperature difference-to-impairment conversion is pre-stored in the look-up-table (LUT), a temperature difference $\Delta T$ between the temperatures read at different time may be further calculated after reading the temperature at time $T_N$ and the value $A_N$ or the difference value $\Delta A$ of the predetermined property corresponding to the temperate temperature difference $\Delta T$ may be obtained by looking up the look-up-table.

S712: Determining whether the packet is ended. If yes, the process is ended. If no, step S708 is returned.

Steps S706-S712 may be performed by the compensation engine 519, and step S708-S712 may be repeatedly performed before the packet is ended. That is, according to an embodiment of the invention, the thermal detection and the property adjustment may be repeatedly performed within the packet.

Taking an OFDM packet as an example, in the embodiments of the invention, the thermal detection may be started when transmitting the preamble and the thermal detection result associated with the preamble may be utilized as a reference to determine the amount of adjustment of the predetermined property for a later section of the packet (for example, the payload or the signal field). Similarly, the thermal detection result associated with a former section of the packet (for example, the signal field) may be utilized as a reference to determine the amount of adjustment of the predetermined property for a later section of the packet (for example, the first data symbol). In this manner, the thermal detection results associated with previously transmitted signal may be provided as a reference for performing the property adjustment on the current transmitting signal, and the property adjustment on the current transmitting signal may be performed based on the thermal detection results associated with previously transmitted signal.

In the second approach, the TX signals are compensated with a programmable threshold. When a signal is transmitted, the compensation engine 519 may record value of the thermal-dependent predetermined property at initialization-stage of the packet at the time T0, where T0 is programmable. Then, the compensation engine 519 may read the temperature with a static period, and cancel the temperature-dependent property variation/impairment caused by temperature variation to ensure signal quality only when the difference of the value of a predetermined property is higher than a given threshold. This is to ensure signal quality and minimize the digital spurs during the transmission. The temperature-to-impairment conversion may be pre-stored in look-up table 521.

Figure 8:
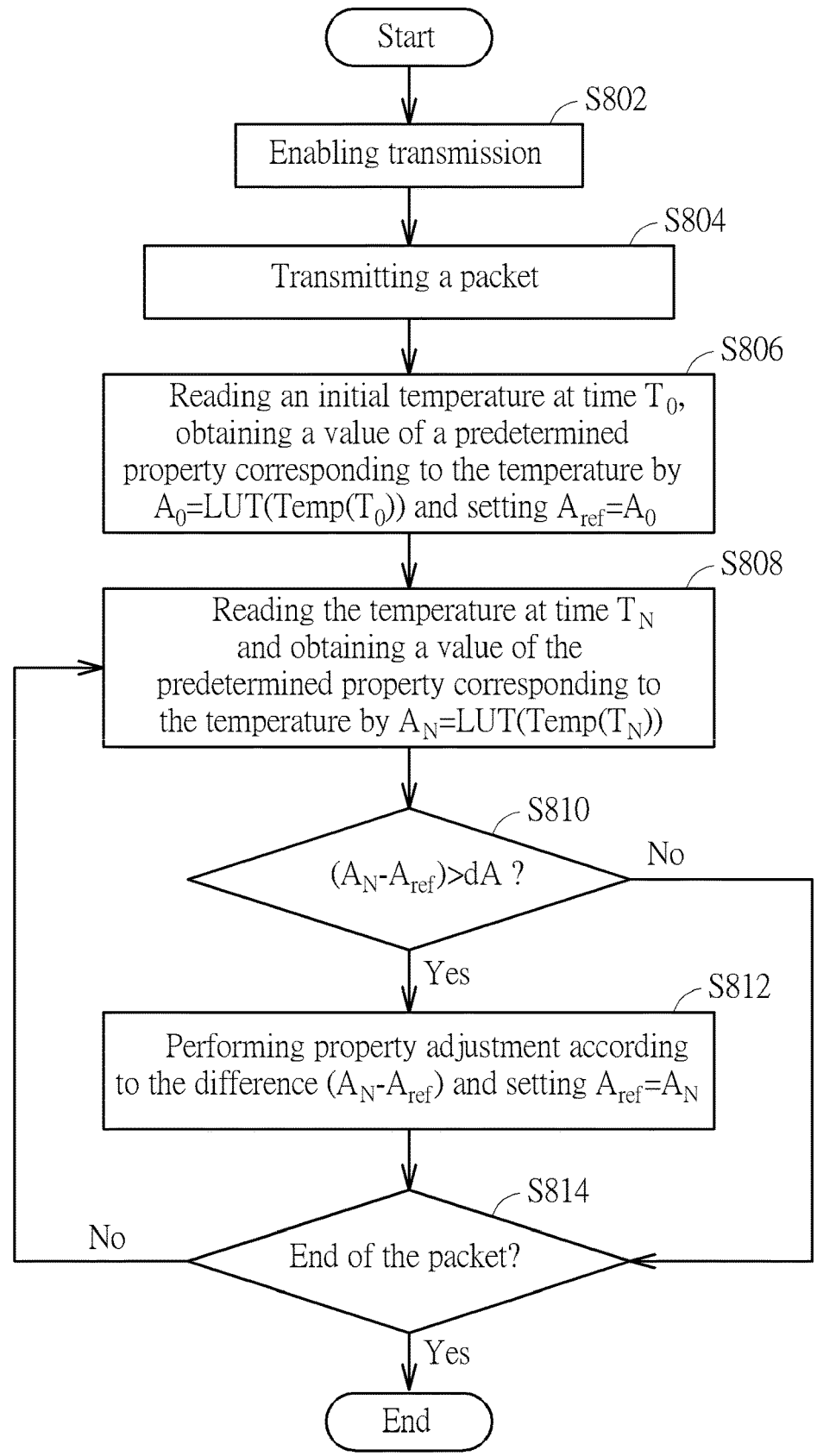
FIG. 8 shows a flow chart of a compensation approach according to a second embodiment of the invention.

FIG. 8 shows a flow chart of a compensation approach according to a second embodiment of the invention. The compensation approach may comprise the following steps:

S802: Enabling the transmission by enabling the signal processing circuits in a transmitter chain for performing a forthcoming packet transmission. Note that the signal processing circuits may be enabled in response to a corresponding enable signal, and when the signal processing circuits are enabled, the thermal sensor 514 is also enabled to perform thermal detection.

S804: Transmitting a packet. Note that the transmitting in step S804 comprises the signal processing performed by the signal processing circuits in the transmitter chain before the signal is actually transmitted out and propagate in the air.

S806: Reading an initial temperature detected in the preamble of the packet (that is, initially detected when the signal processing circuit is processing the preamble of the packet) at time $T_0$, obtaining a value $A_0$ of a predetermined property corresponding to the initial temperature by a temperature-to-impairment conversion pre-stored in the look-up-table (LUT), e.g. $A_0$=LUT(Temp($T_0$)), and setting a reference property value $A_{ref}=A_0$.

S808: Reading the temperature at time $T_N$, where $T_N=T_0+n*T_S$, n is a positive integer and n may be increased every time when the loop is entered again, and obtaining a value $A_N$ of the predetermined property corresponding to the temperature by $A_N$=LUT(Temp($T_N$)).

S810: Determining whether the difference $(A_N-A_{ref})$ is higher than a given threshold dA. If yes, step S812 is performed. If no, step S814 is performed.

S812: Performing property adjustment to adjust a predetermined property of the signal according to the difference $(A_N-A_{ref})$ to compensate for degradation of the packet on the signal to be transmitted and setting $A_{ref}=A_N$. According to an embodiment of the invention, the property adjustment may be performed on the digital signal in digital domain.

S814: Determining whether the packet is ended. If yes, the process is ended. If no, step S808 is returned.

Steps S806-S814 may be performed by the compensation engine 519, and step S808-S814 may be repeatedly performed before the packet is ended. That is, according to an embodiment of the invention, the thermal detection and the property adjustment may be repeatedly performed within the packet.

Taking an OFDM packet as an example, in the embodiments of the invention, the thermal detection may be started when transmitting the preamble and the thermal detection result associated with the preamble may be utilized as a reference to determine the amount of adjustment of the predetermined property for a later section of the packet (for example, the payload or the signal field). Similarly, the thermal detection result associated with a former section of the packet (for example, the signal field) may be utilized as a reference to determine the amount of adjustment of the predetermined property fora later section of the packet (for example, the first data symbol). In this manner, the thermal detection results associated with previously transmitted signal may be provided as a reference for performing the property adjustment on the current transmitting signal, and the property adjustment on the current transmitting signal may be performed based on the thermal detection results associated with previously transmitted signal.

According to an embodiment of the invention, the predetermined property may be a gain, an amplitude, a phase or a DC offset of the signal, or any temperature-dependent property that would be affected or impaired by the thermal transient.

In addition, in the embodiments of the invention, the characteristic value may be an indicator capable of reflecting or indicating signal quality or the transmission performance of the transmitted signal. Therefore, in the embodiments of the invention, the characteristic may be the same as the predetermined property or different from the predetermined property as discussed above.

According to an embodiment of the invention, the characteristic value may be one or multiple impairments degrading EVM or an EVM measurement result of the transmitted signal. After performing the property adjustment (that is, the compensation), such as the property adjustment performed in steps S710 and S812, the impairments degrading EVM or the EVM measurement result of the signal that have been compensated is smaller than the impairments degrading EVM or the EVM measurement result of the signal that is previously transmitted and have not been compensated or have been previously compensated.

For example, after performing the property adjustment (that is, the compensation), the impairments degrading EVM or the EVM measurement result of the transmitted second section of the signal is smaller than the impairments degrading EVM or the EVM measurement result of transmitted first section of the signal, where the first section comes earlier than the second section and is transmitted earlier than the second section as discussed above.

As an example, the thermal detection may be performed when the amplifier 515 is transmitting the signal (packet(s)), periodically and simultaneously over the time. The property adjustment may be performed on the not-yet-transmitted portion of the signal (packet(s)) in module 512 based on the temperature reading stored in the memory of the previous transmitted section (or period) of a packet or packets. After performing the property adjustment, the impairments degrading EVM or the EVM measurement result becomes smaller. The adjustment operation will continue periodically or aperiodically until the end of the signal (packet), since the analog error could vary over the time.

According to another embodiment of the invention, the characteristic value may be an amplitude, a gain or an output power of the transmitted signal (or quadrature mismatch degrading EVM). After performing the property adjustment (that is, the compensation), such as the property adjustment performed in steps S710 and S812, the amplitude, the gain or the output power of the signal that have been compensated is greater or smaller than (depending on the direction of temperature changes) the amplitude, the gain or the output power of the signal that is previously transmitted and have not been compensated or have been previously compensated.

For example, when the temperature increase, the gain may reduce due to the heat. After performing the property adjustment (that is, the compensation), the amplitude of the transmitting section of the signal is greater than the amplitude of the latest transmitted section of the signal. When the temperature decrease, the gain may increase. After performing the property adjustment (that is, the compensation), the amplitude of the transmitting section of the signal is smaller than the amplitude of the latest transmitted section of the signal. The output power is expected to remain the same as previous/the latest transmitted section.

According to yet another embodiment of the invention, the characteristic value may be an in-phase/quadrature (IQ) gain mismatch or an IQ phase mismatch of the transmitted signal. After performing the property adjustment (that is, the compensation), such as the property adjustment performed in steps S710 and S812, the IQ gain mismatch or the IQ phase mismatch of the signal that have been compensated is smaller than the IQ gain mismatch or the IQ phase mismatch of the signal that is previously transmitted and have not been compensated or have been previously compensated.

For example, after performing the property adjustment (that is, the compensation), the IQ gain mismatch or the IQ phase mismatch of the transmitting section of the signal is smaller than the IQ gain mismatch or the IQ phase mismatch of the latest transmitted section of the signal.

According to yet another embodiment of the invention, the characteristic value may be a DC offset or a local oscillator carrier leakage of the transmitted signal. After performing the property adjustment (that is, the compensation), such as the property adjustment performed in steps S710 and S812, the DC offset or the carrier leakage of the signal that have been compensated is smaller than the DC offset or the carrier leakage of another section of the signal that is previously transmitted and have not been compensated or have been previously compensated.

For example, after performing the property adjustment (that is, the compensation), the DC offset or the carrier leakage of the transmitting section of the signal is smaller than the DC offset or the carrier leakage of the latest transmitted section of the signal.

Figure 9:
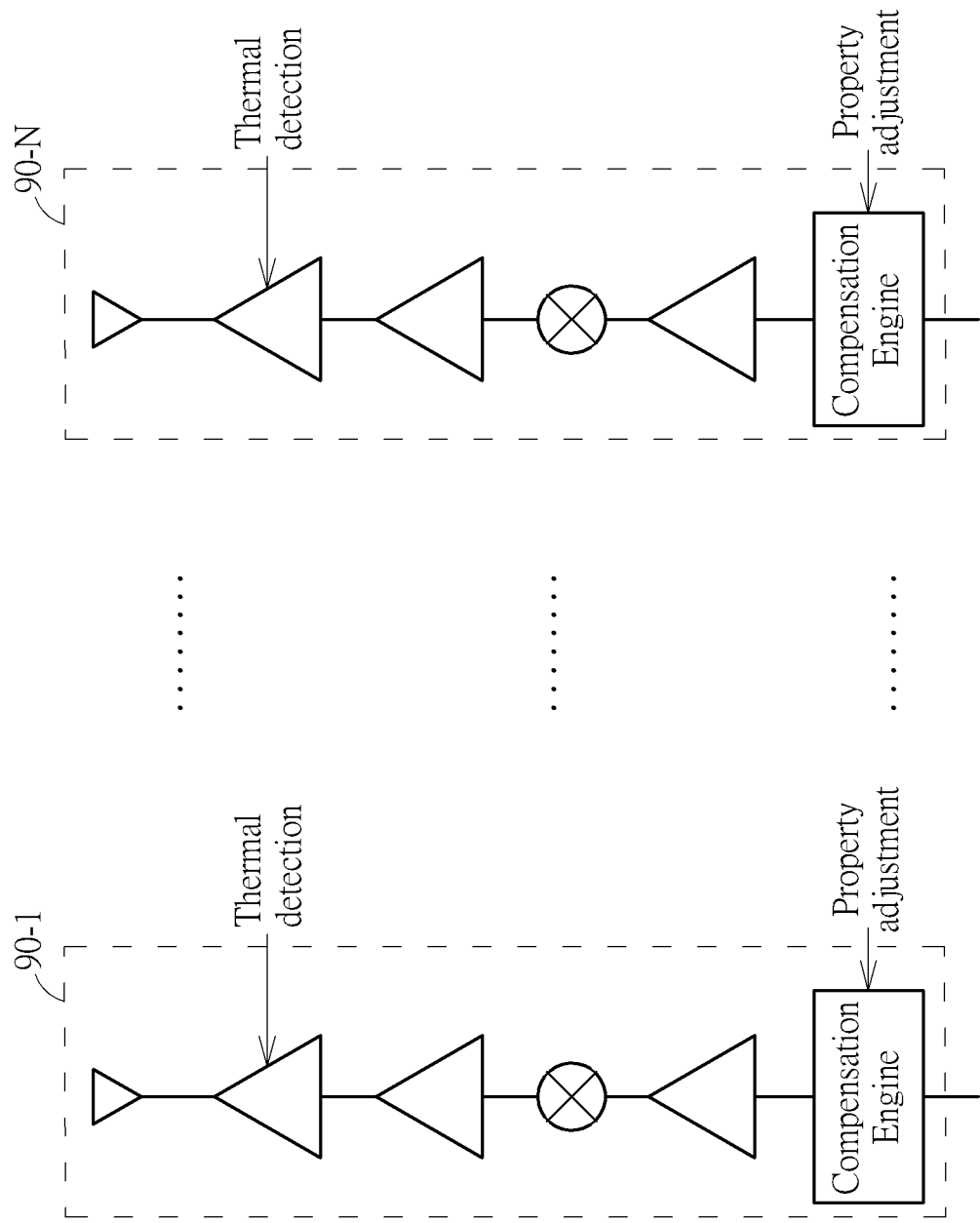
FIG. 9 is a schematic diagram showing the thermal detections adopted in a multi-stream transmitter system according to an embodiment of the invention.

FIG. 9 is a schematic diagram showing the thermal detections adopted in a multi-stream transmitter system according to an embodiment of the invention. Suppose that the transmitter system shown in FIG. 9 comprises N transmitter chains 90-1 to 90-N, where N is a positive integer, and each transmitter chain is capable of transmitting one stream. Each transmitter chain may equip at least one thermal sensor placed next to the heat source and at least one compensation engine, and the thermal detection and the property adjustment may be enabled and performed individually and independently in each transmitter chain. Suppose each transmitter chain is arranged to perform signal processing on one sub-carrier. In the embodiment of the invention, the compensation is applied to the whole sub-carrier (data) instead of the middle of sub-carrier in time domain. This will ensure the quality of demodulation.

Figure 10:
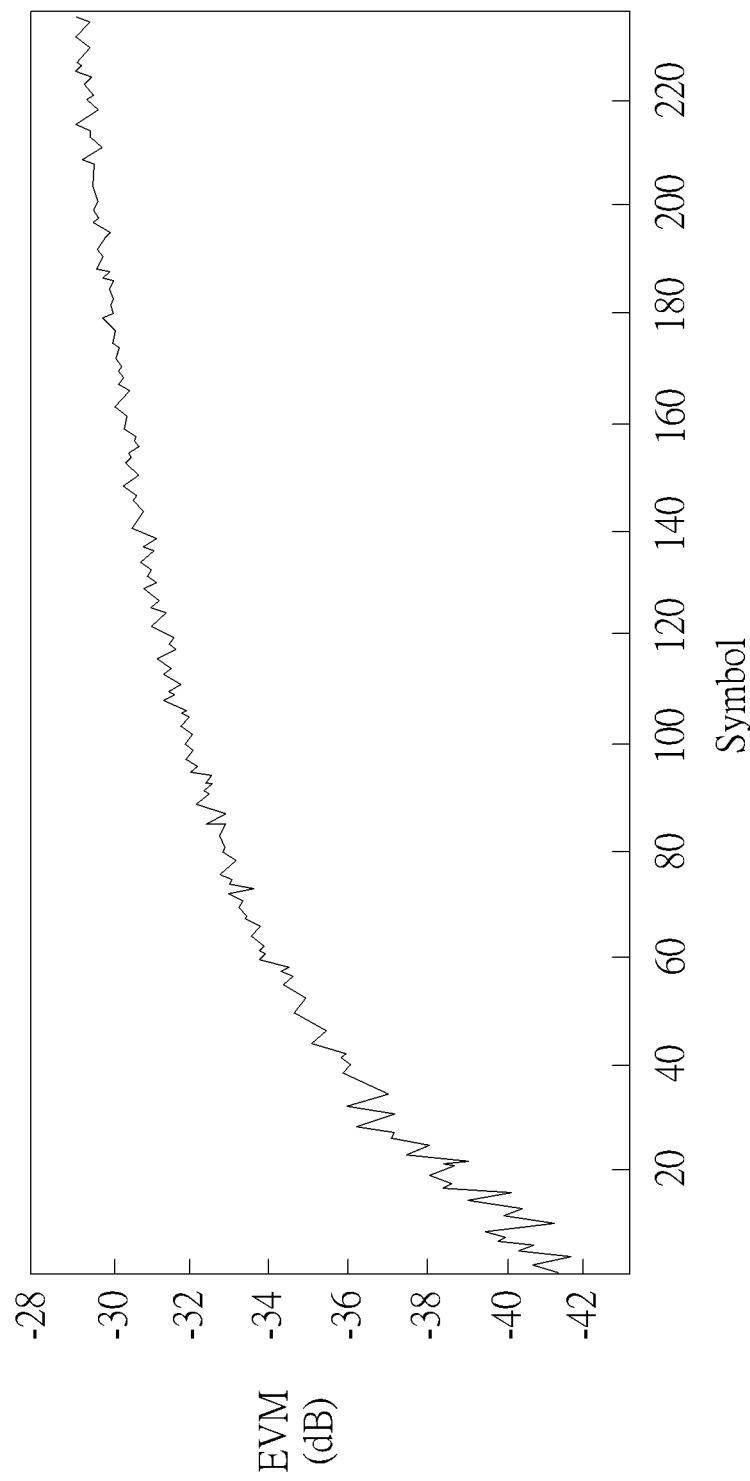
FIG. 10 is a schematic diagram showing the EVM values measured over time (symbols) without compensation.
Figure 11:
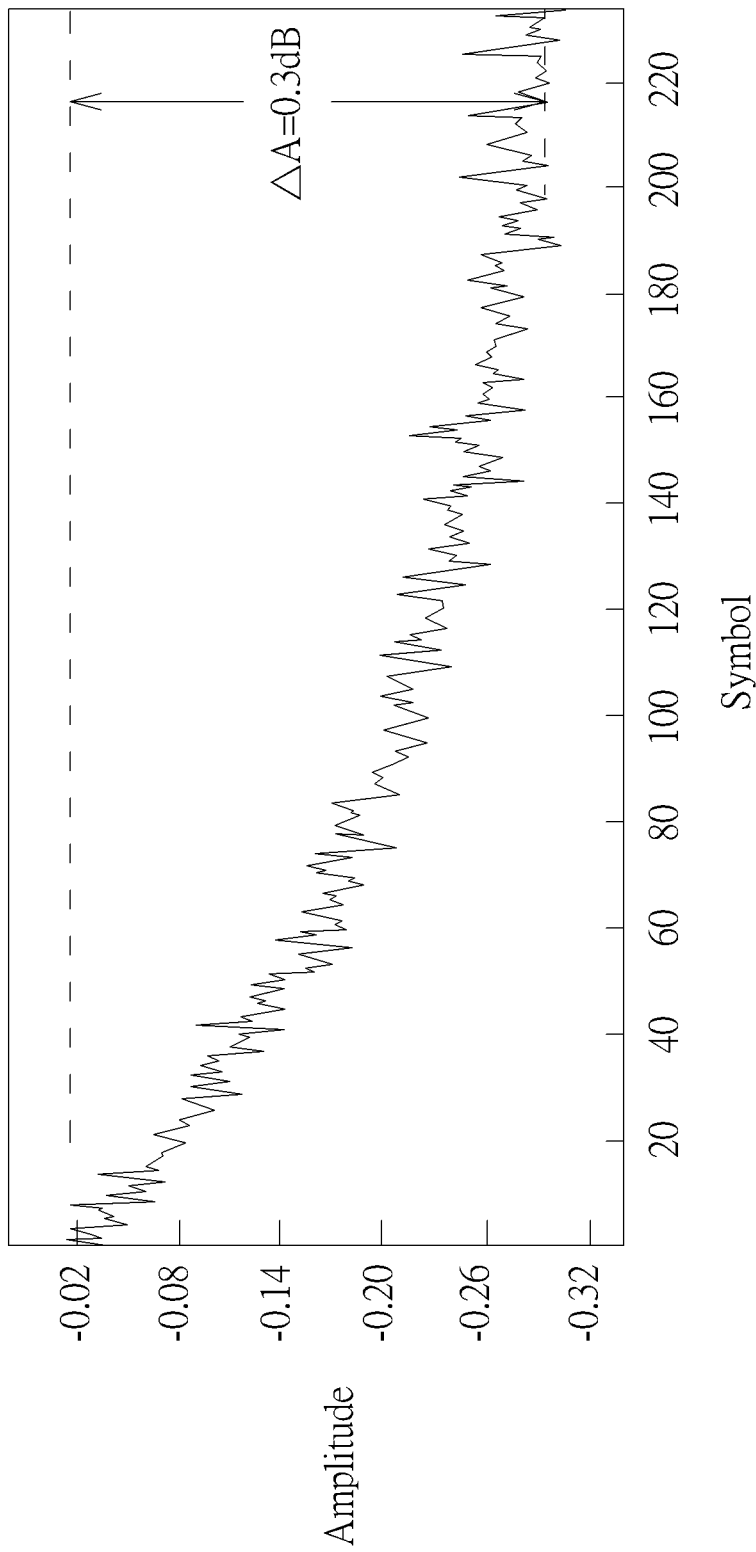
FIG. 11 is a schematic diagram showing the amplitude of the transmitted signal measured over time (symbols) without compensation.

FIG. 10 is a schematic diagram showing the EVM values (e.g. the impairments degrading EVM) measured over time (symbols) without compensation. FIG. 11 is a schematic diagram showing the amplitude of the transmitted (output) signal measured over time (symbols) without compensation. As shown in FIG. 10, without compensation, the EVM value keeps increasing and finally becomes higher than −30 dB. As shown in FIG. 11, without compensation, the amplitude variation keeps decreasing and finally the amplitude variation may reach more than 0.3 dB.

Figure 12:
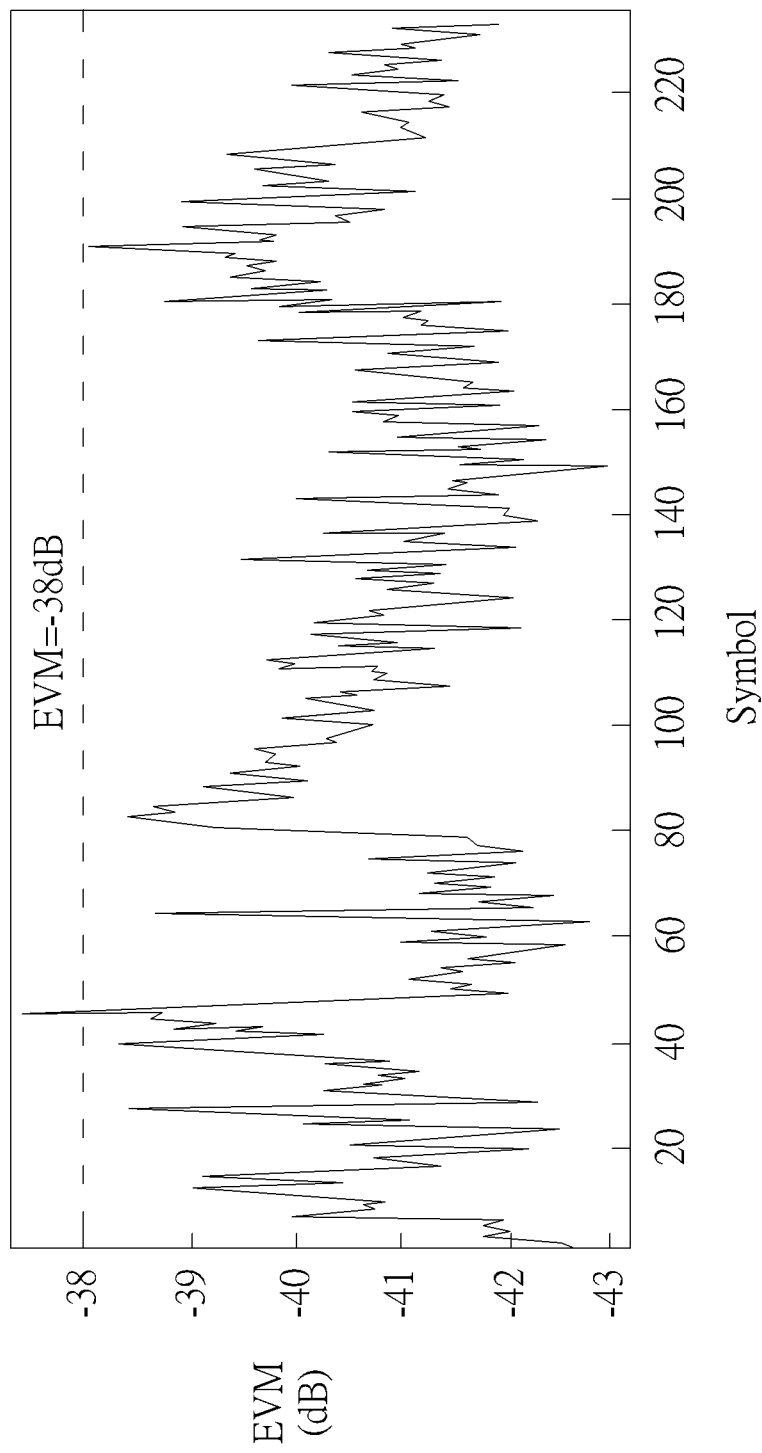
FIG. 12 is a schematic diagram showing the EVM values measured over time (symbols) with compensation.
Figure 13:
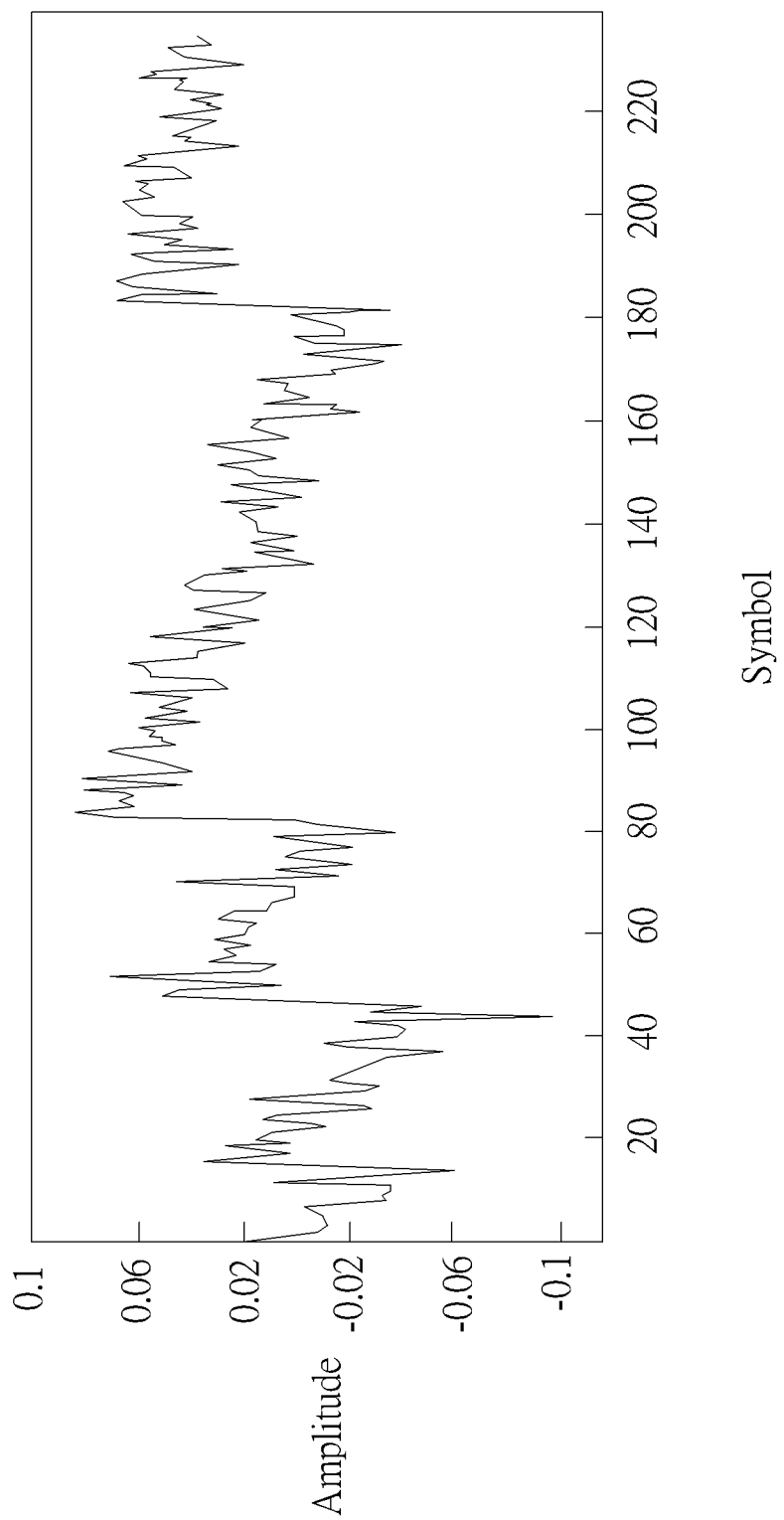
FIG. 13 is a schematic diagram showing the amplitude of the transmitted signal measured over time (symbols) with compensation.

FIG. 12 is a schematic diagram showing the EVM values (e.g. the impairments degrading EVM) measured over time (symbols) with compensation. FIG. 13 is a schematic diagram showing the amplitude of the transmitted (output) signal measured overtime (symbols) with compensation. As shown in FIG. 12, with compensation, the EVM value is greatly reduced and is smaller than the EVM values as shown in FIG. 10 without compensation. For example, the EVM values shown in FIG. 12 is reduced to reach a level (e.g. −38 dB in this embodiment, which may be regarded as a preset level), and is substantially not higher or not worse than the preset level. As shown in FIG. 13, with compensation, the amplitude variation reaches or is reduced to the preset level (e.g. 0.2 dB in this embodiment), and is substantially not greater than the preset level.

Based on the proposed method for compensating for degradation of a signal, including the first approach and the second approach as illustrated above, the conventional problems can be solved and the reception error or decoding error at the receiver side will no longer occur.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A transmitter, arranged to transmit a signal, comprising:
   a first signal processing circuit, arranged to process the signal before transmission;
   a thermal sensor, arranged to perform thermal detection and accordingly generate a thermal detection result, wherein the thermal detection result is indicative of a temperature of the first signal processing circuit;
   a second signal processing circuit, arranged to receive the thermal detection result and perform property adjustment to adjust a predetermined property of the signal according to the thermal detection result,
   wherein the second signal processing circuit adjusts the predetermined property of the signal according to the thermal detection result associated with previously transmitted signal, the second signal processing circuit is arranged to obtain a first value of the predetermined property corresponding to the thermal detection result obtained at a first time, obtain a second value of the predetermined property corresponding to the thermal detection result obtained at a second time, determine whether a difference between the first value and the second value is higher than a given non-zero threshold and perform property adjustment to adjust the predetermined property of the signal according to the difference when the difference between the first value and the second value is higher than the given non-zero threshold,
   wherein the property adjustment is performed on preamble, signal field or data symbol of a packet, and
   wherein after performing the property adjustment, a characteristic value of the signal reaches a preset level.

2. The transmitter of claim 1, wherein the characteristic value is an error vector magnitude (EVM) value, and the EVM value of the signal is smaller than the EVM value of the previously transmitted signal.

3. The transmitter of claim 1, wherein the characteristic value is an amplitude, the amplitude of the signal is greater than the amplitude of the previously transmitted signal when the thermal detection result indicates that the temperature is increasing, and the amplitude of the signal is smaller than the amplitude of the previously transmitted signal when the thermal detection result indicates that the temperature is decreasing.

4. The transmitter of claim 1, wherein the characteristic value is an in-phase/quadrature (IQ) gain mismatch or an IQ phase mismatch, and the IQ gain mismatch or the IQ phase mismatch of the signal is smaller than the IQ gain mismatch or the IQ phase mismatch of the previously transmitted signal.

5. The transmitter of claim 1, wherein the characteristic value is a direct current (DC) offset or a carrier leakage, and the DC offset or the carrier leakage of the signal is smaller than the DC offset or the carrier leakage of the previously transmitted signal.

6. The transmitter of claim 1, wherein the thermal detection and the property adjustment are performed within the packet.

7. The transmitter of claim 1, wherein the property adjustment is performed in digital domain.

8. The transmitter of claim 1, wherein the first signal processing circuit is an amplifier, and the thermal sensor is disposed adjacent to the amplifier.

9. The transmitter of claim 1, wherein the predetermined property is a gain, an amplitude, a phase or a direct current (DC) offset of the signal.

10. A method for compensating for degradation of a signal during transmission of the signal, comprising:
performing thermal detection and accordingly generate a thermal detection result, wherein the thermal detection result is indicative of a temperature of a signal processing circuit; and
performing property adjustment to adjust a predetermined property of the signal according to the thermal detection result,
wherein the property adjustment is performed on the signal according to the thermal detection result associated with previously transmitted signal, and wherein step of performing property adjustment to adjust the predetermined property of the signal according to the thermal detection result further comprises:
obtaining a first value of the predetermined property corresponding to the thermal detection result obtained at a first time;
obtaining a second value of the predetermined property corresponding to the thermal detection result obtained at a second time;
determining whether a difference between the first value and the second value is higher than a given non-zero threshold; and
performing property adjustment to adjust the predetermined property of the signal according to the difference when the difference between the first value and the second value is higher than the given non-zero threshold,
wherein the property adjustment is performed on preamble, signal field or data symbol of a packet, and
wherein after performing the property adjustment, a characteristic value of the signal reaches a preset level.

11. The method of claim 10, wherein the characteristic value is an error vector magnitude (EVM) value, and the EVM value of the signal is smaller than the EVM value of the previously transmitted signal.

12. The method of claim 10, wherein the characteristic value is an amplitude, the amplitude of the signal is greater than the amplitude of the previously transmitted signal when the temperature is increasing, and the amplitude of the signal is smaller than the amplitude of the previously transmitted signal when the temperature is decreasing.

13. The method of claim 10, wherein the characteristic value is an in-phase/quadrature (IQ) gain mismatch or an IQ phase mismatch, and the IQ gain mismatch or the IQ phase mismatch of the signal is smaller than the IQ gain mismatch or the IQ phase mismatch of the previously transmitted signal.

14. The method of claim 10, wherein the characteristic value is a direct current (DC) offset or a carrier leakage, and the DC offset or the carrier leakage of the signal is smaller than the DC offset or the carrier leakage of the previously transmitted signal.

15. The method of claim 10, wherein the thermal detection and the property adjustment are performed within the packet.

16. The method of claim 10, wherein the property adjustment is performed in digital domain.

17. The method of claim 10, wherein the predetermined property is a gain, an amplitude, a phase or a direct current (DC) offset of the signal.

* * * * *